No. 698,911. Patented Apr. 29, 1902.
H. A. DUC, Jr.
DOUGH MIXER AND KNEADER.
(Application filed Aug. 28, 1901.)
(No Model.)
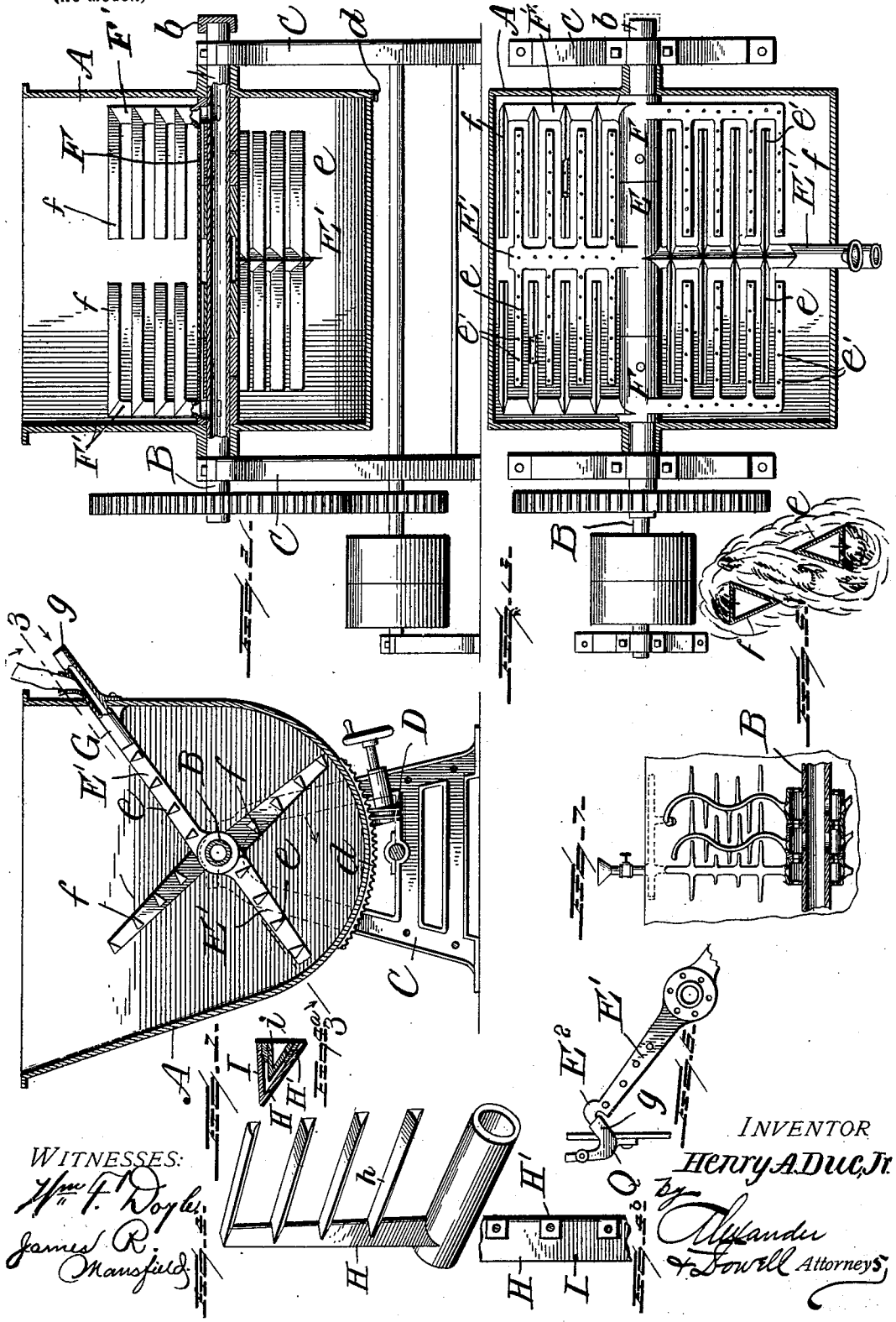
WITNESSES:
INVENTOR
Henry A. Duc, Jr.
by
Alexander
& Dowell Attorneys

UNITED STATES PATENT OFFICE.

HENRY A. DUC, JR., OF CHARLESTON, SOUTH CAROLINA.

DOUGH MIXER AND KNEADER.

SPECIFICATION forming part of Letters Patent No. 698,911, dated April 29, 1902.

Application filed August 28, 1901. Serial No. 73,607. (No model.)

*To all whom it may concern:*

Be it known that I, HENRY A. DUC, Jr., of Charleston, in the county of Charleston and State of South Carolina, have invented certain new and useful Improvements in Dough Mixers and Kneaders; and I hereby declare that the following is a full, clear, and exact description thereof, reference being had to the accompanying drawings, which form part of this specification.

This invention is an improvement in machines for mixing and kneading dough; and its object is to thoroughly incorporate the ingredients and to provide for complete aeration thereof by so constructing the machine that the dough will be aerated simultaneously with the mixing and worked by alternate compression and expansion, the construction being such that the dough itself when in kneading condition will cause an influx of air, such air being introduced through peculiarly constructed and arranged coacting mixing and working arms, the machine, moreover, being very simple in construction and easily cleansed. The water, yeast, &c., can also be introduced into the flour and dough through the hollow arms in a most efficient and advantageous manner.

The invention therefore consists in the novel construction and combination of parts, as hereinafter described and claimed, and illustrated in the accompanying drawings, in which—

Figure 1 is a transverse section through the improved mixer and kneader. Fig. 2 is a longitudinal vertical section therethrough. Fig. 3, a top plan view; Fig. 4, a detail of one of the hollow arms, and Fig. 5 a detail view illustrating the mode of operation of the machine. Figs. 6 and 7 are detail views of modifications. Figs. 4ᵃ and 4ᵇ are detail views of one form of hollow arm.

In said drawings, A designates the hopper in which the dough is mixed. This may be of any suitable construction, being shown of the ordinary construction hung upon a shaft B, journaled in end frames C, and a worm D and segment *d* being provided for tilting the hopper on the shaft and suitable gearing being shown for rotating shaft B. Said shaft B is hollow, but closed at its end, one end being provided with a removable cap *b*.

Centrally supported on the shaft B is a hub or sleeve E, from which spring two or more radial arms E', which are tubular and communicate with the hollow shaft B through suitable openings in the sleeve and shaft, as shown in Fig. 2. From the opposite sides of arms E' extend parallel series of hollow fingers *e*, which are provided with numerous perforations *e'* in their rear sides to permit escape of fluids or air into the hopper. The arms E' are also similarly perforated, as shown.

Fixed on the shaft B within the hopper at opposite sides of sleeve E are the rotary stirrers, which comprise a hollow hub F, hollow arms F', and hollow fingers *f*, the latter springing from arms F' in parallel series, fingers *f* being arranged to alternate with fingers *e* and to pass therebetween as the stirrers rotate. The arms F' communicate with the hollow shaft B through suitable openings in the hubs and shaft, as shown, and said arms and their fingers *f* have numerous perforations in them, as shown, preferably in their rear sides, so that the dough will not be forced into the perforations during the mixing or kneading operations. Preferably the arms E' F' and fingers *e f* are all triangular in cross-section, having their apexes pointing in the direction in which they revolve and the perforations in the bases, as shown. I do not confine myself to this particular form, except where specifically stated in the claims. One arm E' is slightly extended, so as to bring up against a tubular nozzle G, projecting into the hopper at one side thereof, as shown in Fig. 1, and fluids or air can be introduced into the nozzle through a pipe *g* or in other convenient manner, as desired, and flow thence through arms E' into shaft B and thence escape into arms F' and pass through the perforations in fingers *e f* into the flour or dough in the hopper. Air, fluids, &c., could be drawn directly into the shaft B by removing cap *b*, and when the dough is mixed the said cap may be removed, and air will be sucked into the machine by reason of the alternate dividing and compressing or squeezing of the dough in the kneading thereof, as hereinafter explained. I consider the induction of air or fluids through the nozzle G or drawn directly through shaft B a matter of choice or discretion and both embraced in my invention.

In operation the materials to be mixed are placed in the hopper A and shaft B rotated in the direction indicated in Fig. 1, causing fingers $f$ to rotate through the mass, while fingers $e$ remain stationary. The fingers $f$ passing between fingers $e$ cause a thorough intermixture of the ingredients and soon produces the dough of the desired consistency. In this mixing operation water and fluid yeast can be introduced, if desired, through the hollow shaft, arms, and fingers and, as is obvious, will be thoroughly and expeditiously distributed thereby and be quickly and thoroughly incorporated in the mixture in the most advantageous manner. When the dough is produced, the kneading operation begins, and it will be noted that the plastic dough, being caught by fingers $f$, is carried to and against fingers $e$ and divided thereat, being compressed as it is forced between the fingers, and after passing the fingers it reunites. When the dough strikes the fingers, it is divided so as to make a partial vacuum in the mass, which is immediately filled with air supplied through the perforations in the arms and fingers, and then when the dough is compressed the air which is trapped therein is forced through the dough and distributed in the most complete and thorough manner, air being supplied in minute jets throughout the mass of agitated dough and being worked therein by the alternate expansion and compression of the dough as the fingers $f$ sweep past the stationary fingers $e$.

This machine supplies the necessary amount of air throughout the flour, water, yeast, and other constituents of dough simultaneously in the mixing and kneading opertion and possesses many advantages not found in any other machine. The hollow or tubular arms and beaters while passing through, mixing, and kneading the dough form cavities therein and fill them with air or other fluid and then pressing said air-filled dough together as it is drawn between the wedge-shaped kneading and fixed channeled arms or fingers, whereby the air is forcibly caused to permeate every particle of dough without the aid of any fans, pressure-pumps, or mechanism—i. e., the air is first drawn in either through the hollow shaft or fixed tubular arms by the partial vacuum created behind the revoluble and fixed arms or fingers as the plastic dough is drawn therebetween and thereover. The air, &c., may be forced into the machine, if desired; but ordinarily an air-forcing apparatus will not be required, owing to the peculiar construction and arrangement of parts.

In the modification shown in Fig. 6 the arm E' is provided with a curved neck $E^2$, which is adapted to engage with the upturned end $g$ of the nozzle. Fig. 7 indicates how two or more sets of stationary fingers may be arranged on shaft B, alternating with the rotary beaters or fingers fixed on the shaft, all being hollow and having the mode of operation above explained. This figure, moreover, indicates how the arms carrying the fingers may be made crooked or undulating, so as to increase the agitating and kneading of the dough.

In Figs. 4, $4^a$, and $4^b$ I show a convenient and simple manner of constructing the arms and fingers. As shown in these figures, the arm H and its fingers $h$ are formed in or of two V-shaped parts I $i$, both V-shaped in cross-section, as shown in Fig. $4^a$, the outer part I being larger than the inner part $i$ and the latter being kept from direct contact with the inner face of the outer part by lugs H' on the latter, as indicated in Figs. $4^a$ and $4^b$. The space between the two parts forms an air-channel, and the air escapes behind the arms and fingers between the edges of said parts. This construction enables the parts to be readily cleansed, as part $i$ can be removed from part I and the opposed surfaces thereof wiped out and the parts refitted together.

I do not wish to confine myself to any specific sectional contour of the arms and fingers nor to the specific construction thereof herein described except where specifically set forth in the claims.

Having thus described my invention, what I therefore claim as new, and desire to secure by Letters Patent thereon, is—

1. In a dough mixer and kneader, the combination of a hopper or receptacle, a stationary hollow member therein having openings for the escape of air, and a revolving hollow member therein also having openings for the escape of air and adapted to move past the stationary member, whereby air is sucked into the dough and kneaded therein substantially as described.

2. In a dough mixer and kneader, the combination of a series of hollow members having openings for the escape of air, and a cooperating series of hollow members having openings for the escape of air and adapted to alternate with and work between the first series of members, whereby cavities are alternately formed and closed in the dough and air sucked therein through the hollow members for the purpose and substantially as described.

3. In a dough mixer and kneader, the combination of a series of hollow members, and another series of hollow members adapted to work between and intermediate the first series of members, all said members having openings for the escape of air for the purpose and substantially as described.

4. In a dough mixer and kneader, the combination of a hopper, a stationary series of parallel horizontally-arranged hollow members therein having openings for escape of air, and a movable series of hollow parallel members therein having openings for escape of air adapted to work between and intermediate the first series of members, and means for supplying air, &c., to said members, substantially as described.

5. In a dough mixer and kneader, the combination of a hopper, a series of parallel hollow members stationarily mounted therein, and a second series of correspondingly-arranged hollow members rotatably mounted in the hopper, the members of one series being arranged to work intermediate the members of the first series, and all having openings for escape of air; with means for rotating the second series of members, substantially as described.

6. In a dough mixer and kneader, the combination of a hopper, a rotatable shaft, hollow arms thereon provided with projecting hollow fingers having openings for the escape of air, and non-rotatable hollow arms provided with hollow fingers having openings for the escape of air coacting with the rotating arms and fingers, for the purpose and substantially as described.

7. In a dough mixer and kneader, the combination of a hopper, a stationary series of hollow arms provided with parallel hollow fingers, and a series of movable hollow arms provided with hollow fingers adapted to coact with the non-rotating fingers, said arms and fingers having openings for the escape of air, and means for rotating said movable arms and fingers, substantially as described.

8. In a dough mixer and kneader, the combination of a hopper, a hollow shaft therein, a sleeve on said shaft within the hopper provided with radially-projecting hollow arms communicating with the hollow shaft, and parallel series of fingers projecting from said arms; with rotary beaters on said shaft comprising hollow radial arms communicating with the shaft and provided with series of hollow parallel fingers adapted to alternate with and pass between the fingers on the first-mentioned arms, said arms and fingers having openings for the escape of air, substantially as described.

9. In a dough mixer and kneader, the combination of a hopper, a feed pipe or nozzle attached thereto, a rotary shaft passing axially through the hopper, a hub or sleeve on said shaft provided with oppositely radially projecting tubular arms having series of tubular fingers projecting horizontally therefrom, and a hub keyed on the shaft provided with radial tubular arms from which spring horizontally-disposed series of tubular fingers adapted to pass between the fingers on the stationary arm, said arms and fingers communicating and having openings for the escape of air, substantially as described.

10. In a dough mixer and kneader, the combination of a hopper, a rotatable shaft, a series of rotating hollow arms thereon provided with projecting hollow triangular fingers having openings for the escape of air, and a series of non-rotatable hollow arms provided with triangular hollow fingers having openings for the escape of air coacting with the rotating arms and fingers, for the purpose and substantially as described.

11. In a dough mixer and kneader, the combination of a hopper, a stationary series of hollow arms provided with parallel triangular hollow fingers, and a second series of rotating hollow arms provided with triangular hollow fingers adapted to coact with the non-rotating fingers, said fingers having openings for the escape of air in their bases; means for rotating the second series of arms, and means for supplying air, &c., to said arms and fingers, substantially as described.

12. In a dough mixer and kneader, the combination of a hopper, a series of parallel horizontally-arranged hollow fingers stationarily mounted therein, and a second series of corresponding horizontally-arranged hollow fingers rotatably mounted in the hopper, the fingers of one series being arranged to work intermediate the fingers of the first series, said arms and fingers being composed of two castings each triangular in cross-section, substantially as described.

13. In a dough mixer and kneader, the combination of a hopper, a feed pipe or nozzle in one side thereof, a rotary shaft passing axially through the hopper, a stationary hub or sleeve loosely mounted on said shaft provided with oppositely radially projecting tubular arms having series of tubular fingers projecting horizontally therefrom, one of said arms communicating with said nozzle; with a hub keyed on the shaft provided with radial tubular arms from which spring horizontally-disposed series of tubular fingers adapted to pass between the fingers on the stationary arms, all said arms and fingers communicating through their hubs, substantially as and for the purpose set forth.

14. In a dough mixer and kneader, a hollow stirring member composed of two hollow or channeled castings fitted one within the other, so as to leave an air-channel therebetween, substantially as and for the purpose set forth.

15. In a dough mixer and kneader, the combination of a hopper or receptacle; with a hollow stirring member composed of an arm provided with a series of parallel fingers, said arms and fingers being angular in section and composed of two hollow or channeled castings fitted one within the other, substantially as and for the purpose described.

In testimony that I claim the foregoing as my own I affix my signature in presence of two witnesses.

HENRY A. DUC, JR.

Witnesses:
JAMES R. MANSFIELD,
ARTHUR E. DOWELL.